United States Patent [19]

Israelsen

[11] Patent Number: 5,426,475
[45] Date of Patent: Jun. 20, 1995

[54] DEVICES FOR SUPPORTING AND TRANSPORTING OVERHEAD TRANSPARENCIES WHICH SIMPLIFIES THE USAGE OF SUCH TRANSPARENCIES

[76] Inventor: E. Arvel Israelsen, 800 Crescent Way, Apt C, Arcata, Calif. 95521

[21] Appl. No.: 240,561

[22] Filed: May 11, 1994

[51] Int. Cl.⁶ .............................................. G03B 21/00
[52] U.S. Cl. ................ 353/120; 353/DIG. 5; 353/119
[58] Field of Search .......... 353/120, DIG. 1, DIG. 5, 353/119; 206/455, 456, 449, 555

[56] References Cited

U.S. PATENT DOCUMENTS

| | | | |
|---|---|---|---|
| 4,634,001 | 1/1987 | Waskelin | 206/555 |
| 4,679,923 | 7/1987 | Nielsen | 353/DIG. 5 |
| 4,715,705 | 12/1987 | Nord | 353/DIG. 5 |
| 5,029,709 | 7/1991 | Faulstick | 206/455 |

Primary Examiner—William A. Cuchlinski, Jr.
Assistant Examiner—William C. Dowling

[57] ABSTRACT

A new and improved device for supporting and transporting overhead transparencies which simplifies the usage of such transparencies comprising: a pair of essentially rigid planar primary lateral wall of an enlarged height and width positionable parallel with each other during the closed orientation, the planar primary panels having short lateral walls extending perpendicularly from the side edges and having short spine wall extending perpendicularly from the lower edge to form a partial box-like configuration, the lateral walls and spine walls providing bearing faces therebetween when in the closed orientation; a hinge coupling the outside extension of the spine walls of the two primary lateral walls allow the pivoting of each primary lateral walls away from other lateral wall; and two secondary lateral walls of an essentially rigid material having a short height and having a width essentially equal to the width of the primary panels, with hinges to couple the upper edge of each primary panel to the lower edge of each secondary panel.

7 Claims, 4 Drawing Sheets

DEVICES FOR SUPPORTING AND TRANSPORTING OVERHEAD TRANSPARENCIES WHICH SIMPLIFIES THE USAGE OF SUCH TRANSPARENCIES

BACKGROUND OF THE INVENTION

1. Field of the invention

The present invention relates to new and improved devices for supporting and transporting overhead transparencies which simplifies the usage of such transparencies and more particularly pertains to supporting and transporting overhead transparencies in a device which allows a user to manipulate the transparencies with greater facility.

2. Description of the Prior Art

The use of supporting and transportation devices for sheet material is known in the prior art. More specifically, supporting and transportation devices for sheet material heretofore devised and utilized for the purpose of supporting sheet material for transportation and manipulation purposes are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,531,193 a transparency holder for overhead projections.

U.S. Pat. No. 4,498,746 discloses an extension platform to support transparencies for an overhead projector.

U.S. Pat. No. 4,787,738 discloses a holder for overhead projection system transparencies.

U.S. Pat. No. 5,073,023 discloses an overhead projector display.

U.S. Pat. No. 5,198,846 discloses a manual cassette system for overhead projection transparencies.

None of the devices disclosed in the above U.S. Patents are regularly shown in supplier catalogs, nor are they commonly used by those individuals presenting lectures utilizing overhead transparencies, nor are they commonly observed by participants attending seminars with or supplemented by overhead transparencies.

In this respect, the new and improved devices for supporting and transporting overhead transparencies according to the present invention substantially departs from the conventional concepts and designs of the prior art, and in doing so provides an apparatus primarily developed for the purpose of supporting and transporting overhead transparencies in a device which allows a user to manipulate the transparencies with greater facility.

Therefore, it can be appreciated that there exists a continuing need for new and improved devices for supporting and transporting overhead transparencies which simplifies the usage of such transparencies which can be used for supporting and transporting overhead transparencies in a device which allows a user to manipulate the transparencies with greater facility. In this regard, the present invention substantially fulfills this need.

SUMMARY OF THE INVENTION

In view of the foregoing disadvantages inherent in the known types of supporting and transportation devices for sheet material now present in the prior art, the present invention provides a new and improved device, simple and useable, for supporting and transporting overhead transparencies which simplifies the usage of such transparencies. As such, the general purpose of the present invention, which will be described subsequently in greater detail, is to provide a new and improved devices for supporting and transporting overhead transparencies which simplifies the usage of such transparencies and method which has all the advantages of the prior art and none of the disadvantages.

To attain this, the present invention essentially comprises a new and improved device for supporting and transporting overhead transparencies which simplifies the usage of such transparencies comprising, in combination, a pair of essentially rigid planar primary lateral walls of an enlarged height and width positionable parallel with each other during the closed orientation, the planar primary panels having short lateral walls extending perpendicularly from the side edges and having short spine walls extending perpendicularly from the lower edge to form a partial box-like configuration, the lateral walls and spine walls providing bearing faces therebetween when in the closed orientation; a hinge coupling the outside extension of the spine walls to allow the pivoting of each primary lateral wall away from the other lateral wall; two secondary lateral walls of an essentially rigid material having a short height and having a width essentially equal to the width of the primary panel, with hinges to couple the upper edge of each primary panel to the lower edge of each secondary panel, each secondary panel having perpendicular short lateral walls and a perpendicular short upper end wall with handle extending upwardly, the lateral and end walls form a partial box-like configuration, the secondary lateral wall being pivotable to an orientation essentially perpendicular to the upper extent of the primary panels and there stabilized by knee braces attached to and spanning between sockets in the lateral walls of the primary and secondary panels to provide support when the device is opened and resting on its spine walls and the handles on the secondary panels to thereby form angles of about thirty degrees from the plane supporting the opened device; a handle extending upwardly from the short upper panel for each secondary panel; a separable ligament to couple the two primary and secondary panels together when in a closed orientation for transporting overhead transparency sheet material therein; a groove formed of the inside surface of the spine wall in a central location and an extendible pointer therein retained by the opposite spine wall in the closed orientation; and undulations formed on the facing edges of the lateral walls of the primary and secondary panels and the end walls of the secondary panels for forming a tight coupling between the panels when in the closed orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. However, specifically including any of the several fixed and rigid arrangements of two primary lateral walls with associated lateral side walls and spine walls, arranged as described, exclusive of spine hinges, secondary lateral walls and associated lateral walls, upper end walls, sockets, knee braces, handles and separable ligaments, as required for a compact transportable device, to facilitate the use and handle of overhead transparencies during a lecture presentation situation supplemented by overhead transparency visual aids.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved devices for supporting and transporting overhead transparencies which simplifies the usage of such transparencies which have all the advantages of the prior art supporting and transportation devices for sheet material and none of the disadvantages.

It is another object of the present invention to provide new and improved devices for supporting and transporting overhead transparencies which simplifies the usage of such transparencies which may be easily and efficiently manufactured and marketed.

It is further object of the present invention to provide new and improved devices for supporting and transporting overhead transparencies which simplifies the usage of such transparencies which are of durable and reliable constructions.

An even further object of the present invention is to provide new and improved devices for supporting and transporting overhead transparencies which simplifies the usage of such transparencies which are susceptible of a low cost of manufacture with regard to both materials and labor, and which accordingly are then susceptible of low prices of sale to the consuming public, thereby making such new and improved devices for supporting and transporting overheard transparencies which simplifies the usage of such transparencies economically available to the buying public.

Still yet another object of the present invention is to provide new and improved devices for supporting and transporting overhead transparencies which simplifies the usage of such transparencies which provide in the apparatuses and methods of the prior art some of the advantages thereof, while simultaneously overcoming some of the disadvantages normally associated therewith.

Still another object of the present invention is to support and transport overhead transparencies in a device which allows a user to manipulate the transparencies with greater facility.

Lastly, it is an object of the present invention to provide new and improved devices for supporting and transporting overhead transparencies which simplifies the usage of such transparencies comprising: a pair of essentially rigid planar primary lateral walls of an enlarged height and width positionable parallel with each other during the closed orientation, the planar primary panels having short lateral walls extending perpendicularly from the side edges and having a short spine wall extending perpendicularly from the lower edge to form a partial box-like configuration, the lateral walls and spine walls providing bearing faces therebetween when in the closed orientation; a hinge coupling the outside extension of the spine walls of the two primary side panels to allow the pivoting of each primary lateral wall away from the other lateral wall; and two secondary lateral walls of an essentially rigid material having a short height and having a width essentially equal to the width of the primary panels, with hinges to couple the upper edge of each primary panel to the lower edge of each secondary panel, each secondary panel having perpendicular short lateral walls and a perpendicular short upper end wall with handle extended upwardly; the lateral and end walls form a partial box-like configuration, the secondary lateral wall being pivotable to an orientation essentially perpendicular to the upper extent of the primary panels and there stabilized by knee braces attached to and spanning between sockets in the primary and secondary panel lateral walls to provide a support when the device is opened and resting on its spine walls and the handles on the upper end walls to thereby form angles of about twenty to thirty-five degrees from the plane supporting the operated device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
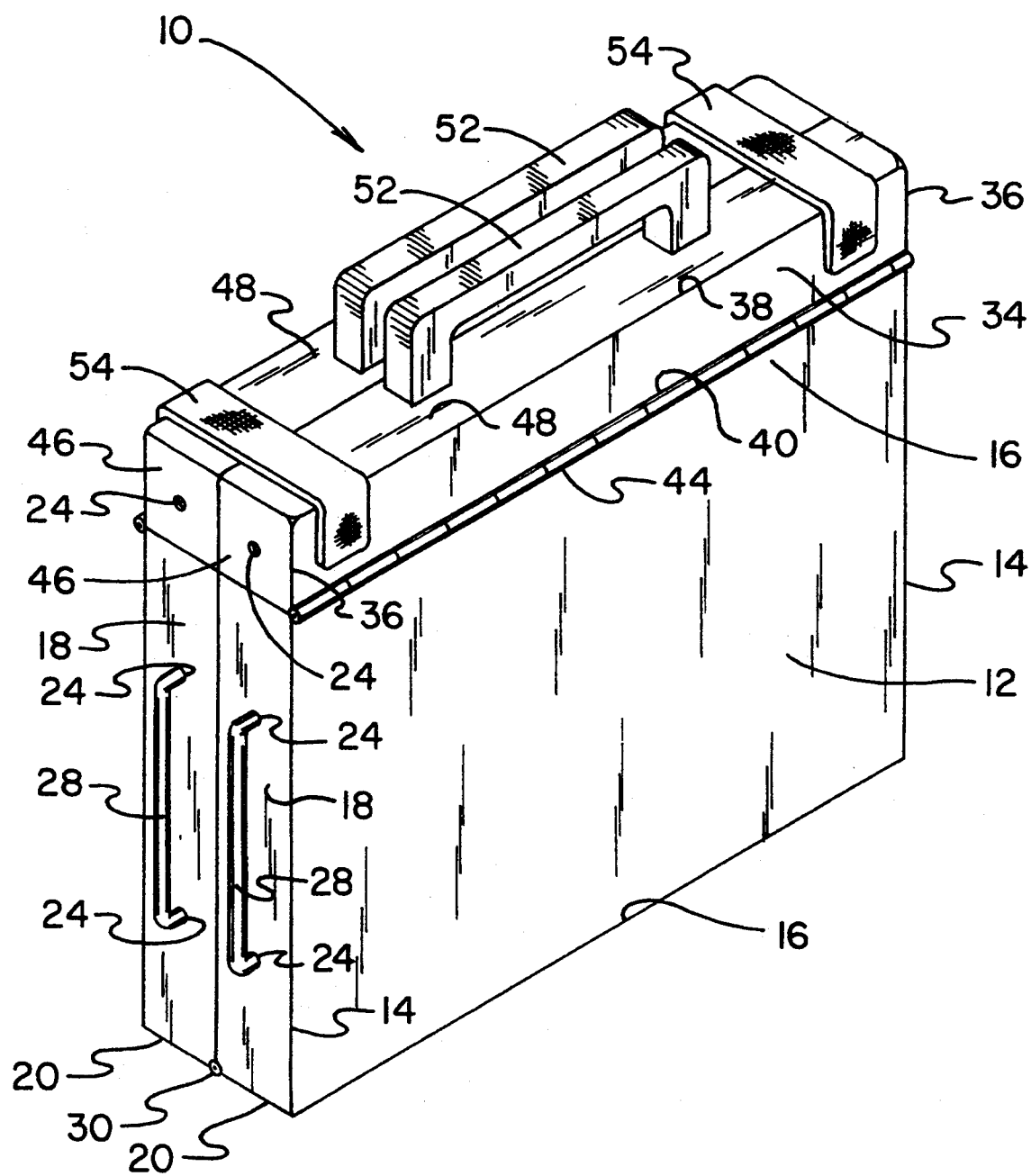
FIG. 1 is a perspective illustration of the preferred embodiment of the new and improved devices for supporting and transporting overhead transparencies which simplifies the usage of such transparencies constructed in accordance with the principles of the present invention.
Figure 2:
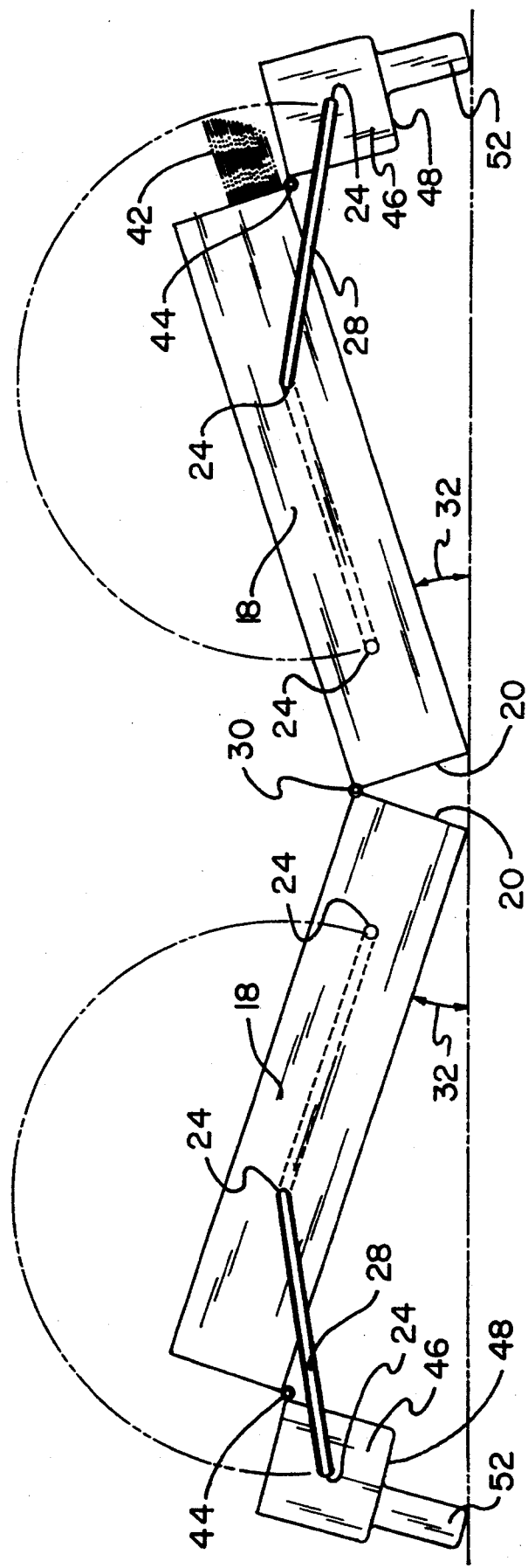
FIG. 2 is a end elevational view of the device of FIG. 1 but in the open orientation.
Figure 3:
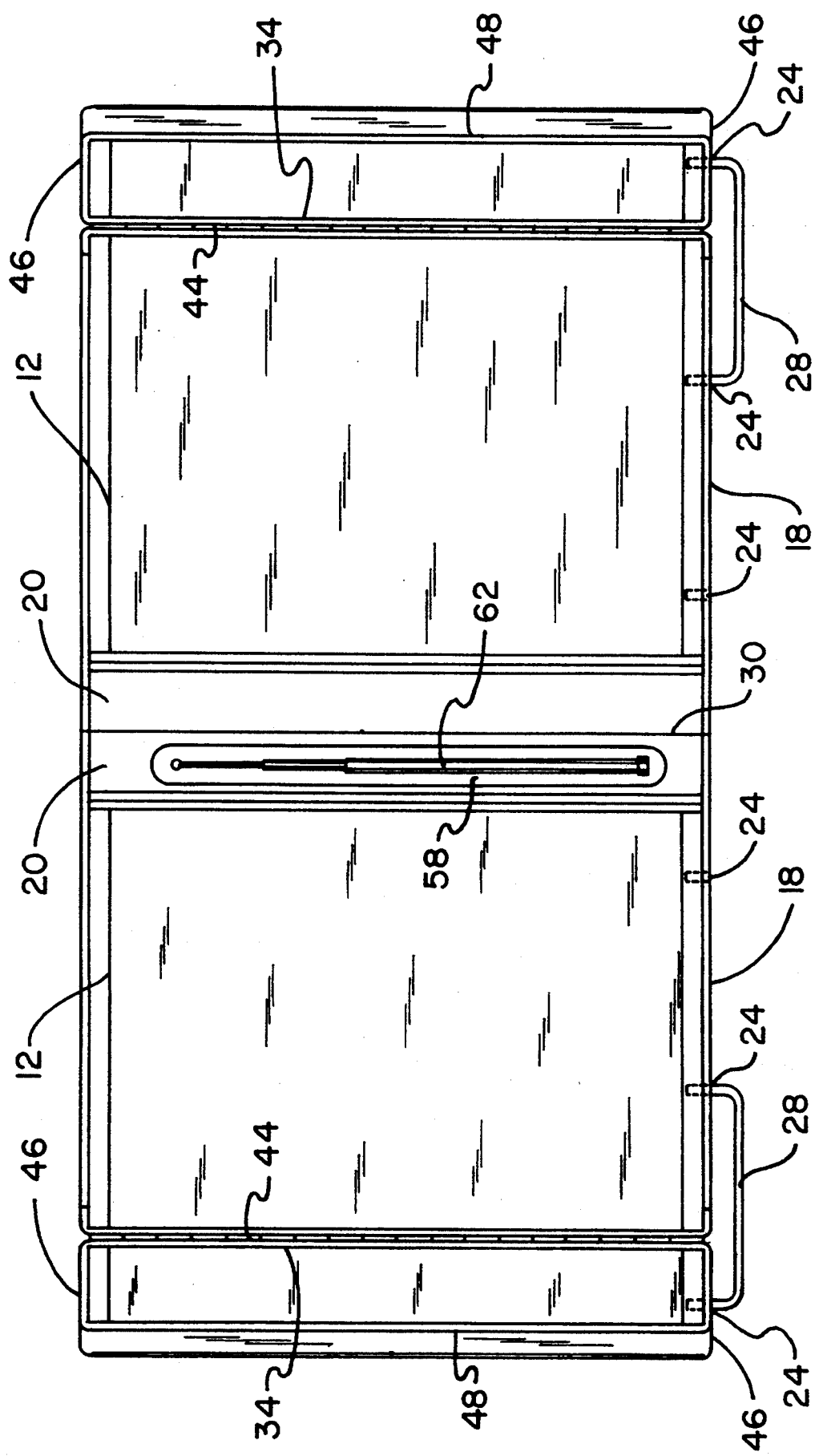
FIG. 3 is a top view of the device of the prior Figures showing the device in an open orientation.
Figure 4:
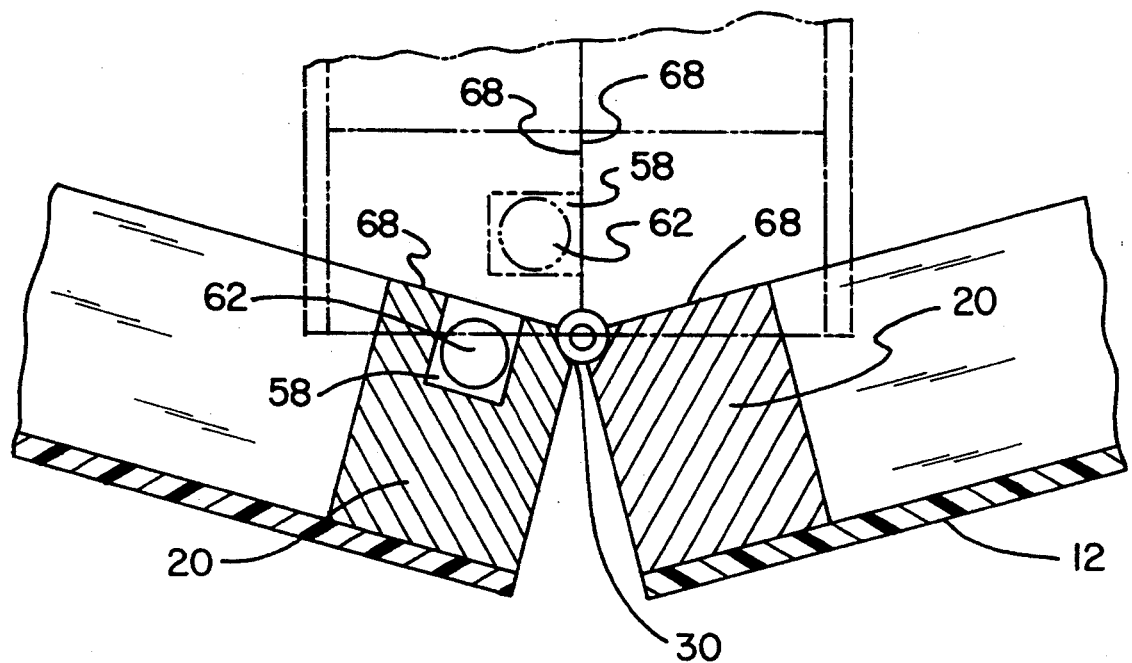
FIG. 4 is an enlarged end view in section to show certain internal constructions thereof.
Figure 5:
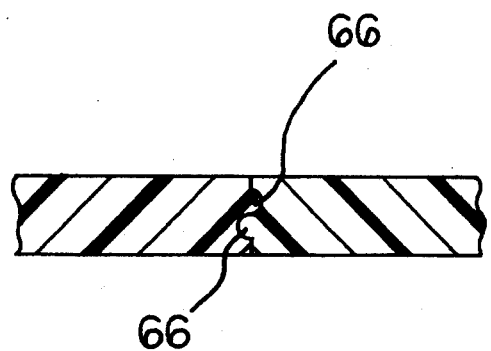
FIG. 5 is an enlarged sectional view of the area of coupling at the adjacent edges of the device of the prior Figures.

With reference now to the drawings, and in particular to FIG. 1 thereof, the preferred embodiment of the new and improved devices for supporting and transporting overhead transparencies which simplifies the usage of such transparencies embodying the principles and concepts of the present invention and generally designated by the reference numeral 10 will be described.

The present invention, the new and improved devices for supporting and transporting overhead transparencies which simplifies the usage of such transparencies, is in essence a system comprised of a plurality of components. In their broadest context, such components include primary lateral walls, a spine hinge coupling the lateral walls, secondary lateral walls above the primary lateral walls to form a completely enclosed container therewithin, handles, knee braces, separable ligaments, a groove with a pointer retained, and undulations formed on the facing edges of the various lateral walls and upper end walls.

Each of the components is individually configured and correlated one with respect to the other to attain the intended objectives.

More specifically, the central parts of the device 10 is a pair of rigid planar primary lateral walls 12. Such lateral walls are of an essentially rigid material and construction. They are of an enlarged height measured along parallel side edges 14 and of a width greater than the height measured along upper and lower parallel edges 16. The parallel edges together form a rectangular configuration. The primary lateral walls are adapted to be positioned parallel with each other when the device is in a closed orientation.

The planar primary panels have short lateral walls 18. Such short lateral walls extend perpendicularly from the side edges of the primary lateral walls. Also provided is a short wall 20 extending perpendicularly from the lower edge of the primary lateral wall. The lateral walls are formed to provide bearing surfaces therebetween when the device is in the closed orientation. Together the lateral walls, the spine walls and the primary lateral walls form a partial box-like configuration.

The spine hinge 30 couples each lower edge of each primary lateral wall. The hinge pivot is contiguous with the outside extension of the spine walls of the primary lateral walls. This allows the pivoting of each primary lateral wall away from the other lateral wall. It also allows the two lateral walls to open fully for retrieval of the extensible primary pointer or overhead transparencies 42 otherwise retained within the device for transport.

Next provided is a secondary lateral wall 34. The secondary lateral wall is of an essentially rigid material similar to that of the primary lateral wall. One such secondary lateral wall is provided for each side of the device. The secondary lateral walls have a short height measured along side edges 36. They also have a width measured across the upper and lower edges 38 and 40. Such width is essentially equal to the width of the primary lateral walls.

Hinges 44 are provided to couple the upper edge of each primary panel to the lower edge of each secondary panel. Each secondary panel has a perpendicular short lateral wall 46 and a upper end wall 48. Together the lateral walls, the upper end wall and the secondary panel form a partial box-like configuration.

The secondary lateral walls are pivotable to an orientation essentially perpendicular to the upper extent of the primary panels. This provides a support for the upper edges of the primary panels when the device is opened and resting on its spine walls and the handle 52 mounted on the upper end walls. The angles formed are about thirty degrees 32 from the plane supporting the opened device to either primary lateral wall.

Next provided are two knee braces 28 each consisting of an interconnecting stiff-back with two parallel tangs located one at each end of and oriented 90 degrees from the line of the stiff-back. The knee brace is attached to the lateral walls of the primary and secondary lateral walls to stabilize the secondary panel essentially perpendicular to the primary lateral walls and thus provide stable support for the primary lateral wall while in use in the open orientation. The knee brace is attached to the respective lateral walls by inserting the tangs into sockets 24 conveniently located in the primary and secondary lateral walls. For transport the one tang is removed from the secondary lateral wall socket and the knee brace is rotated about the other tang until the free tang can be inserted into the second socket conveniently located in the primary lateral wall.

Next provided is a handle 52. The handle is actually two similarly shaped handles which extend upwardly on the short upper end wall for each secondary panel. Separable ligaments 54 function to couple together the two primary and secondary lateral walls when the device is in a closed orientation. Such closed orientation is for transporting overhead transparency sheet material located therein.

Next provided is a groove 55 formed on the inside surface of one spine wall, centrally located. In association therewith, an extendible pointer 57 may be placed in the groove and is retained in the groove by the contiguous opposite spine wall in the closed orientation for transport. This adds greater utility for the device when used during lecture presentations supplemented by overhead transparencies.

The last features of the invention are undulations 66. Such undulations are formed on the facing edges 68 of the lateral walls, of the primary and the secondary panels and the upper end walls of the secondary panels. Together such undulations form a tight coupling for the panels when the device is in a closed orientation.

The present invention effectively prevents the loss and disarray of transparencies resulting from slipping or sliding to the floor. It facilitates referring to transparencies previously shown without losing the sequence of the transparency stack and it keeps the transparencies neatly stacked for recovery at the end of the presentation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved device for supporting and transporting overhead transparencies which simplifies the usage of such transparencies comprising, in combination:
 a pair of essentially rigid planar primary lateral walls of an enlarged height and width positionable parallel with each other during a closed orientation, the planar primary walls having short lateral walls extending perpendicularly from the side edges and having a short spine wall extending perpendicularly from the lower edge, the short spine wall having an outside extension, the lateral walls and spine walls providing bearing faces therebetween when in the closed orientation, the lateral walls and spine walls form a partial box-like configuration;
 a hinge coupling the outside extension of the spine walls of the two primary lateral walls to allow the pivoting of each primary lateral wall away from the other lateral wall;
 a pair of secondary lateral walls each of an essentially rigid material having a short height and having a width essentially equal to the width of the primary wall, with hinges to couple the upper edge of each primary wall to the lower edge of each secondary wall, each secondary wall having perpendicular snort lateral walls and a short upper end wall with a handle extending upwardly, the lateral end walls form a partial box-like configuration, the secondary lateral wall being pivotable to an orientation essentially perpendicular to the upper extent of the primary walls and there stabilized by knee braces attached to and spanning between sockets in the primary and secondary walls to provide support when the device is opened and resting on its spine walls and handles to thereby form angles of about thirty degrees from the plane supporting the open device;
 a handle extending upwardly from the short upper end wall for each secondary wall;
 a separable ligament to couple the two primary and secondary walls together when in a closed orientation for transporting overhead transparency sheet material therein;
 a groove formed on the inside surface of one spine wall in a central location and an extensible pointer retained in place by the opposite spine wall in the closed orientation for transport of transparency sheets therein and;
 undulations formed on the facing edges of the lateral walls of the primary and secondary walls and the upper ends walls of the secondary walls form forming a tight coupling between the walls when in the closed orientation.

2. A new and improved device for supporting and transporting overhead transparencies which simplifies the usage of such transparencies the device having a closed orientation and an open orientation comprising:
 a pair of essentially rigid planar primary lateral walls of an enlarged height and width positionable parallel with each other during the closed orientation, the planar primary walls having short lateral walls extending perpendicularly from the side edges and having a short spine wall extending perpendicularly from the lower edge, the short spine wall having an outside extension, the lateral walls and spine walls providing bearing faces therebetween when in the closed orientation, the lateral walls and spine walls form a partial box-like configuration;
 a hinge coupling the outside extension of the spine walls of the two primary lateral walls to allow the pivoting of each primary lateral wall away from the spine independently of the other lateral wall;
 two secondary lateral walls of an essentially rigid material having a short height and having a width essentially equal to the width of the primary wall, with hinges to couple the upper edge of each primary wall to the lower edge of each secondary wall, each secondary wall having perpendicular short lateral walls and a perpendicular short upper end wall to form a partial box-like configuration, the lateral walls and upper end walls providing bearing faces therebetween when in the closed orientation, the secondary lateral walls being pivotable to an orientation essentially perpendicular to the upper extent of the primary walls to provide a support when the device is opened and resting on its spine wall and handles to thereby form angles of about twenty to thirty-five degrees from the plane supporting the device.

3. The device as set forth in claim 2 and further including a handle extending upwardly from the short upper end wall for each secondary wall.

4. The device as set forth in claim 2 and further including separable ligaments to couple the two primary and secondary walls, together when in a closed orientation for transporting overhead transparency sheet material therein, 5. The device as set forth in claim 2 and further including a groove formed on the inside surface of one spine wall in a central location anti an extendible pointer retained by the opposite spine wall in the closed orientation for transport, 6. The device as set forth in claim 2 and further including undulations formed on the facing edges of the lateral walls of the primary and secondary walls and the upper end walls of the secondary walls for forming a tight coupling between the walls when in the closed orientation.

7. The device as set forth in claim 2 and further including two knee braces consisting of an interconnecting stiff-back with two parallel end tags oriented 90 degrees from the stiff-back and insertable into two sockets conveniently located in the primary and secondary panel lateral side walls for the purpose of stabilizing the secondary lateral wall essentially perpendicular from the primary lateral wall to provide support while the device is in the open orientation.

* * * * *